United States Patent Office 3,795,684
Patented Mar. 5, 1974

3,795,684
KETENE DIMERS FROM LONG CHAIN ALKANOIC ACIDS WITH PERFLUOROALKYL TERMINAL SEGMENTS
Elemer Domba, Olympia Fields, Ill., assignor to Nalco Chemical Company, Chicago, Ill.
No Drawing. Continuation-in-part of abandoned application Ser. No. 146,439, May 24, 1971. This application Oct. 27, 1972, Ser. No. 301,392
Int. Cl. C07d 3/00
U.S. Cl. 260—343.9    3 Claims

ABSTRACT OF THE DISCLOSURE

Polyfluorinated ketene dimers having the structure:

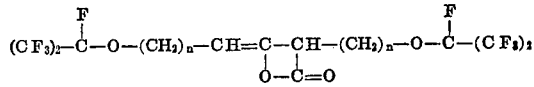

where $n$=an integer from 1–12. These compounds exhibit unusual water repellancy where $n$=7–12.

---

This application is a continuation in part of application Ser. No. 146,439, filed May 24, 1971 now abandoned, entitled "Polyfluorinated Diketenes," in the name of Elemer Domba.

Diketenes per se have been well known in the art commencing with the work of Staudinger, Ber. 38, 1735 (1905). The ensuing work of Sauer, JACS 69, 2444 (1947) and Hanford et al., Organic Reactions III, 109 (1947) is pertinent and a recent literature review on preparations and uses is given in Encyclopedia of Chemical Technology II, 12, 87 (1967).

The prior art relative to polyfluorinated diketenes is of comparatively recent vintage and is exemplified by the following patent art:

3,280,150—England et al. (Du Pont) showing production of β-lactones from fluorinated ketenes;
3,517,065—Fedding (ICI) teaching
(C$_2$H$_5$)$_2$(CF$_3$)C—CH=C=O,
a perfluorinated ketene which is produced from the corresponding perfluoroalkyl-substituted acetic acid; and
U.K. British 1,008,919—(Du Pont) showing the pyrolysis/dehydration of α,α - diperfluoroalkyl - substituted acetic acids.

The compounds of the present composition differ from those of the prior art structurally by the presence of a heptafluoroisopropoxy alkylene group where the alkylene bridging unit may be (CH$_2$)$_n$ where $n$=1–12.

The criticality of this grouping is illustrated by superior water repellancy on leather and paper.

A preferred group of compounds includes polyfluorinated ketene dimers having the structure:

where $n$=an integer from 1–12. These compounds exhibit unusual water repellancy where $n$=7–12.

It is further of interest in the structure above that the dimer contains bis ether links together with the characteristic unsaturated β-lactone dimer structure.

Generalized process of preparation

In the present process, approximately equimolar quantities of hexafluoroacetone (HFA) and a ω-haloalkyl ethyl monocarboxylic acid ester and a water-soluble fluoride salt such as potassium fluoride are reacted in DMF (dimethylformamide). Nucleophilic addition of fluoride to hexafluoroacetone and substitution on the terminal carbon of the non-acid substituent remote from the halo group yields the condensation product, a fluorinated ether ester known as a heptafluoroisopropoxy alkyl ethyl ester. The length of the chain of the carboxylic acid ester utilized less 2 carbon atoms necessary to form the β-lactone determines $n$=1–12 in the formula above. Also in the above, the ω-halo reactant is defined to include chloro and bromo, and may include the methyl and propyl substituents as well as ethyl.

This heptafluoroisopropoxy ether ester is then hydrolyzed with base to give the corresponding heptafluoroisopropoxy alkanoic acid. Chlorination of this acid and subsequent reaction with conventional dehydrating agents (such as phosphoric anhydride, thionyl chloride or triethylamine) yields the desired ketene dimer of the monomer heptafluoroisopropoxy alkyl ketene.

Composite reaction scheme:

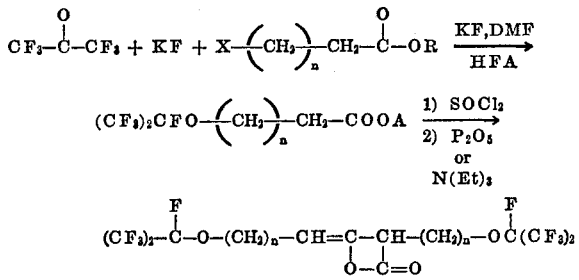

X=Cl, Br
R=Me, Et, Propyl
$n$=1–12

EXAMPLE 1

Preparation of perfluoroalkylalkyl ethers

A dry three-neck flask was fitted with a Dry-Ice reflux condenser, gas-inlet tube and stirrer. 1 mole dry potassium fluoride was placed in the flask, followed by 250 ml. DMF (dimethylfromamide). The dispersion was cooled to 0° C. and hexafluoroacetone was introduced (1 mole). As the system warmed, formation of the fluorocarboxylate was evidenced by by the disappearance of the dispersed KF, giving a homogeneous solution.

Then 1 mole of ClCH$_2$CH$_2$COOEt was added in one batch. The Dry-Ice condenser was replaced with a water condenser and the reaction mixture was heated overnight at 70–80° C. After filtration of the formed precipitate (KCl), the fluoroether was isolated from the filtrate using fractional distillation. B.P.=136–138° C.

The heptafluoroisopropoxy ethyl propionate thus formed was then hydrolyzed with a 15% aqueous solution of potassium hydroxide, yielding, after neutralization, heptafluoroisopropoxy propionic acid. Heptafluoroisopropoxy propionic acid was then refluxed 2–6 hours in thionyl chloride (1.5 moles). The acid chloride thus formed was dissolved in diethyl ether and then treated with triethylamine (1 mole). The amine salt was removed by filtration and the filtrate yielded

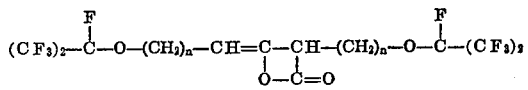

where R=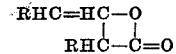(CF$_3$)$_2$CFOCH$_2$—

EXAMPLE 2

ω-Bromoethyl decanoate (1 mole) was slowly added to a stirred flask containing a mixture of HFA (1 mole), potassium fluoride (1 mole) and DMF. The mixture was heated overnight at about 65° C. with continuous stirring. Sufficient water was then added to dissolve potassium chloride and the non-aqueous portion of the mixture was separated and washed several times with water to remove more potassium chloride.

The heptafluoroisopropoxy ethyl decanoate thus formed was then hydrolyzed with a 15% aqueous solution of potassium hydroxide, yielding, after neutralization, heptafluoroisopropxy decanoic acid. Heptafluoroisopropoxy decanoic acid was then refluxed overnight in thionyl chloride (1.5 moles). The acid chloride thus formed was dissolved in diethyl ether and then treated with triethylamine. The amine salt was removed as in Example 1 and the ketene dimer

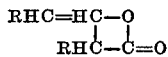

where

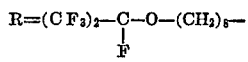

was recovered.

The embodiments of the invention in which an exclusive property or privilege is claimed are defined as follows:

1. A polyfluorinated ketene dimer selected from

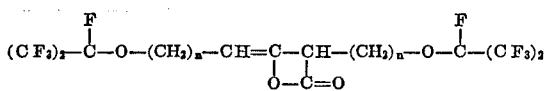

wherein $n=7-12$.

2. The compound according to claim 1 wherein $n=7$.
3. The compound according to claim 1 wherein $n=12$.

References Cited

UNITED STATES PATENTS 3,280,150  10/1966  England et al. _____ 260—343.5

DONALD G. DAUS, Primary Examiner

A. M. TIGHE, Assistant Examiner

U.S. Cl. X.R.

260—484 R, 535 H, 544 Y; 117—135.5, 142, 152